United States Patent [19]  [11] 3,869,075
Kissner  [45] Mar. 4, 1975

[54] SPARE TIRE CARRIER, REAR BUMPER AND TRAILER HITCH ASSEMBLY FOR TRUCKS

[76] Inventor: Herbert G. Kissner, Box 1391, Assinibola, Saskatchewan, Canada

[22] Filed: June 25, 1973

[21] Appl. No.: 373,610

[52] U.S. Cl............. 224/42.06, 214/454, 224/42.12
[51] Int. Cl............................................. B62d 43/04
[58] Field of Search ........... 214/450, 451, 452, 453, 214/454; 224/42.12, 42.21, 42.13, 42.05, 42.14, 42.23, 42.06

[56] References Cited
UNITED STATES PATENTS
1,953,953  4/1934   Carr................................. 224/42.13
3,012,685  12/1961  Toyama............................ 214/454
3,187,914  6/1965   Peras................................ 214/451
3,323,667  6/1967   Hall.................................. 214/454
3,398,846  8/1968   Ragan............................. 224/42.21
3,618,835  11/1971  Terry et al...................... 224/42.06

Primary Examiner—Albert J. Makay
Assistant Examiner—Jerold M. Forsberg
Attorney, Agent, or Firm—Stanley G. Ade

[57] ABSTRACT

An enclosed boxing is secured to a bumper and lies under the rear of a truck. A hinged door in the bumper provides access to the boxing which holds the spare wheel and tire. When the door is opened, springs secured to a semi-circular strap surrounding the tire, ejects the tire slightly to facilitate removal from the boxing. A hitch assembly is secured to the hinged door.

4 Claims, 5 Drawing Figures

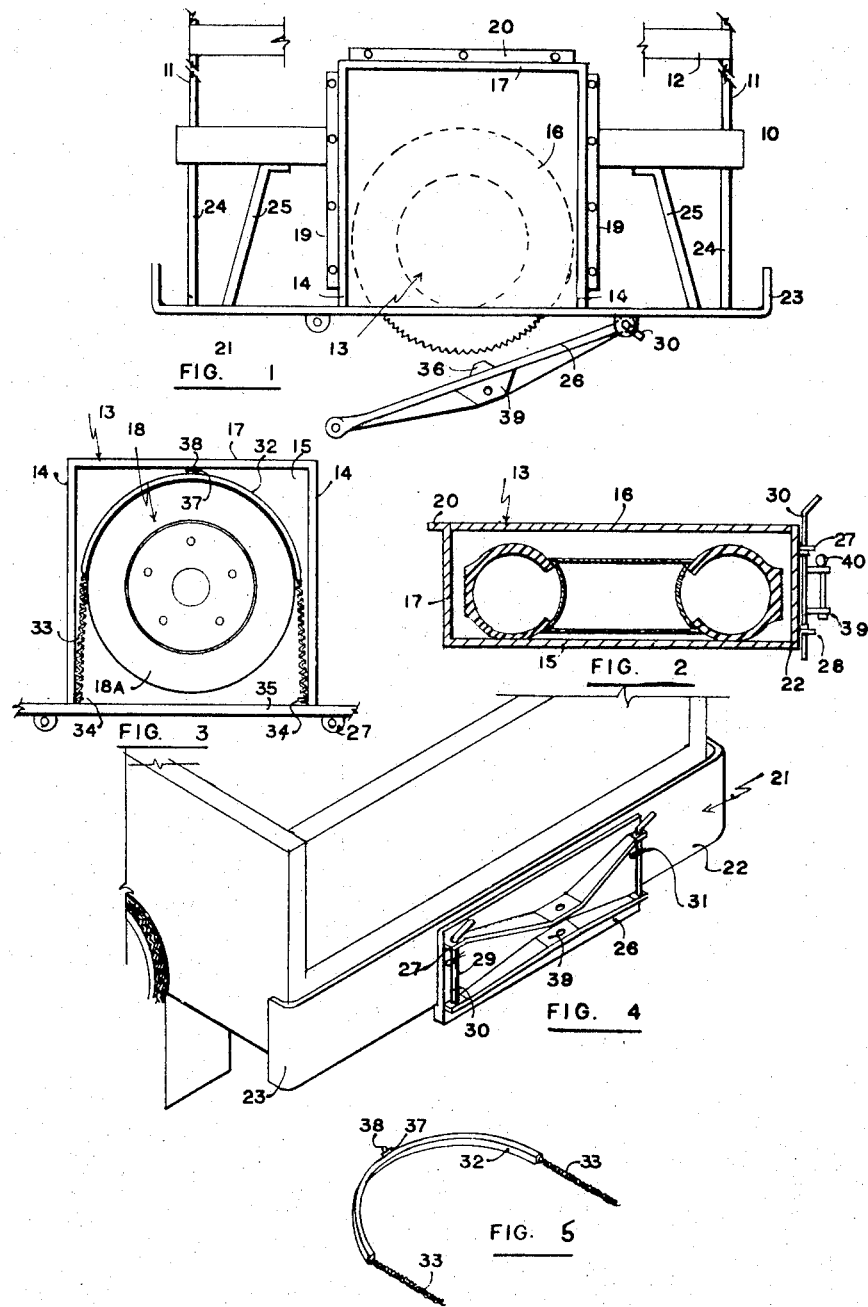

SPARE TIRE CARRIER, REAR BUMPER AND TRAILER HITCH ASSEMBLY FOR TRUCKS

BACKGROUND OF THE INVENTION

Spare wheel and tire assemblies are normally carried in the box of a truck. However, these interfere with loading and unloading and if it is desired to obtain access to the spare wheel and tire assembly when the truck is fully loaded, sometimes the truck box has to be partially unloaded to obtain access to the spare wheel and tire assembly. Open frame-type carriers have been provided underneath the rear frame of trucks but these suffer from the principal disadvantage of becoming clogged with ice, snow or mud particularly during inclement weather so that removal of the spare wheel and tire assembly from the carrier is sometimes impossible. Furthermore, it is often necessary to lie on one's back in order to remove the spare wheel and tire assembly from underneath the frame of the truck.

SUMMARY OF THE INVENTION

The present device overcomes all of these disadvantages by providing an enclosed boxing underneath the rear of a truck which holds the wheel and tire assembly and protects same from the elements. Furthermore means are provided to partially eject the wheel and tire assembly from the boxing when the access door is opened thus facilitating removal of the wheel and tire assembly from the boxing when desired.

Another object of the invention is to provide a device of the character herewithin described in which the boxing is incorporated within the bumper assembly of the truck and the access door forms part of the bumper which can be swung to one side or the other in order to obtain access to the wheel and tire assembly.

A still further object of the invention is to provide a device of the character herewithin described which incorporates a hitch assembly on the access door so that equipment or trailers can be towed behind the truck.

Yet another object of the invention is to provide a device of the character herewithin described which is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF THE DRAWINGS

FIG. 1 is a top plan view of the rear end of the frame of a truck with my device incorporated therein and the access door partially opened.

FIG. 2 is a side elevation of the device per se.

FIG. 3 is a top plan view of the device per se with the upper plate removed to show the interior thereof.

FIG. 4 is a fragmentary isometric view of the rear of a truck with the device incorporated within a bumper assembly.

FIG. 5 is an isometric view of the ejector mechanism per se.

In the drawings like characters of reference indicate corresponding parts in the different figures.

DETAILED DESCRIPTION

Proceeding therefore to describe the invention in detail, reference character 10 illustrates the rear transverse frame member of a truck with 11 indicating the longitudinal frame members and 12 a transverse brace extending therebetween.

My device collectively designated 13 consists of a rectangular boxing incorporating a pair of spaced and parallel sides 14, a base 15, and upper side 16, and a rear side 17, all of which forms an enclosure within which a conventional wheel and tire assembly 18 may be placed for storage purposes.

Side flanges 19 are provided adjacent the upper side 16 and the boxing may be secured to the rear frame member 10 by bolts extending through the frame and through these flanges.

A transverse rear flange 20 is also provided and may be bolted to the transverse member 12. However, inasmuch as such bolting assemblies are conventional, they have not been shown as they will vary depending upon the construction and make of the truck to which the device is secured.

Preferably but not necessarily, the boxing or assembly 13 may be incorporated with a rear bumper assembly collectively designated 21. This consists of a substantially rectangular heavy duty plate 22 having curved ends 23 which in turn is secured to the rear frame member 10 by means of brace brackets 24 and diagonal braces 25. Under these circumstances the sides 14 and the upper sides 16 may be secured to the inner surface of the plate 22 either by welding, bolting or similar means (not illustrated).

In the event that the boxing is combined with the bumper assembly, an access door 26 is provided and forms part of the bumper plate 22. Pairs of lugs 27 extend from the plate 22 and corresponding pairs of lugs 28 extend from the vertical edges 29 of the access door 26. Heavy duty pivot pins 30 extend through apertures in the lugs 27 and 28 and secure the door in the closed position with conventional hairpin type clips 31 preventing inadvertent displacement of these pivot pins. However, it will be appreciated that if either of the pivot pins 30 is removed, the access door 26 will hinge one way or the other thus providing access to the boxing 13 within which the spare wheel and tire assembly 18 is situated.

Means are provided to facilitate the withdrawal of the spare wheel and tire assembly from the boxing 13 and take the form of a curved strapping or band 32 which normally extends around the rear perimeter of the tire 18A of the wheel and tire assembly 18. Relatively heavy duty tension springs 33 extend from the ends of the band to anchor points 34 situated one upon each side of the side members 14 adjacent the open front side 35 of the boxing and these tension springs are extended when the wheel and tire is in the innermost position shown in FIG. 3 and this, of course, being maintained in this position by the fact that the access door 26 is also in the closed position and engaging the front of the tire 18A.

As soon as the access door is opened, the springs 33 retract and withdraw the wheel and tire assembly approximately 6 inches so that it extends from the boxing and enables the operator to withdraw same without too much difficulty.

Means are provided to prevent rattling and comprise an anti-rattle wedge device 36 situated upon the inner surface of the door 26 which engages against the tire 18A when in the closed position.

A further anti-rattle device 37 consists of a strap with rubber tips 38 upon the end, secured to the strapping or band 32 intermediate the ends thereof and which presses against the rear side 17 when the assembly is in the position shown in FIG. 3. This adequately prevents the wheel and tire assembly from rattling during normal travel.

Finally, a hitch assembly 39 is provided upon the access door 26 which may take a hitch pin (not illustrated) or a hitch ball assembly 40 for attachment to any implement or trailer which may be towed by the truck.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. A device for attachment to the rear of a truck underneath the frame thereof comprising in combination an enclosed boxing adapted to receive a spare wheel and tire assembly, means to support said boxing to the underside of said truck, an access door in the front of said boxing, and means in said boxing to partially eject the associated wheel and tire assembly when said access door is opened, said means including a curved band extending around the rear perimeter of the associated tire, and tension spring means extending between the ends of said band and an anchor point adjacent each side of the open side of said boxing, normally biassing said band towards said open side.

2. The device according to claim 1 which includes anti-rattle means on said door and said band holding said wheel and tire assembly firmly in position and against the pressure of said spring means when said door is closed.

3. The device according to claim 1 which includes a bumper assembly for said truck, said boxing being secured to said bumper assembly, said access door forming part of said bumper assembly.

4. The device according to claim 2 which includes a bumper assembly for said truck, said boxing being secured to said bumper assembly, said access door forming part of said bumper assembly.

* * * * *